United States Patent [15] 3,635,647

Kim [45] Jan. 18, 1972

[54] ELECTRICAL RESISTOR CIRCUIT FOR SEQUENTIALLY FLASHING PHOTOFLASH LAMPS

[72] Inventor: Sang-chul Kim, Cleveland Heights, Ohio

[73] Assignee: General Electric Company

[22] Filed: June 3, 1970

[21] Appl. No.: 42,952

[52] U.S. Cl. ..................................... 431/95, 317/80
[51] Int. Cl. ..................................... F21k 5/02
[58] Field of Search ............................ 431/95, 93, 94

[56] References Cited

UNITED STATES PATENTS 3,518,487 6/1970 Tamaka et al. ....................431/95 X
3,532,931 10/1970 Cote ....................431/95 X

*Primary Examiner*—Edward J. Michael
*Attorney*—Norman C. Fulmer, Henry P. Truesdell, Frank L. Neuhauser, Oscar B. Waddell and Joseph B. Forman

[57] ABSTRACT

A simplified resistance-type of circuit for causing sequential flashing of photoflash lamps from firing pulses of electrical energy. The basic circuit consists of four flashlamps connected in series in a closed electrical loop. Two resistors are connected "crisscross" between diagonally opposite lamp junctions of the series loop, and the circuit is adapted for connection to a source of firing pulses across one of the flashlamps. Circuit modifications are disclosed for different numbers of flashlamps.

14 Claims, 5 Drawing Figures

Inventor:
Sang-Chul Kim
by Norman C. Fulmer
His Attorney

ELECTRICAL RESISTOR CIRCUIT FOR SEQUENTIALLY FLASHING PHOTOFLASH LAMPS

BACKGROUND OF THE INVENTION

The invention is in the field of electronic circuitry for sequentially flashing photoflashlamps, and is particularly useful with a unitary array of flashlamps, such as three or four or more lamps arranged to radiate their light in the same direction when they are sequentially flashed, so that the array need not be moved nor removed until all of its lamps have been flashed.

Numerous circuits have been devised for successively flashing photoflashlamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flashlamps and adapted to actuate switching means for connecting the pulse source to successively different flashlamps as each lamp becomes flashed; and a further type of circuit utilizes transistors or thyristors for automatically connecting the pulse source to successively different flashlamps as each lamp becomes flashed.

Another previously proposed circuit employs resistors successively connected in series with a plurality of individual flashlamps, so that the lamps are connected in electrical parallel through the resistors. The firing pulse source is connected to an end of the circuit, whereby each flashlamp is connected across the pulse source through successively greater resistance. THe first pulse flashes the nearest lamp, which becomes an open circuit upon flashing, whereupon the next pulse flashes the next lamp, etc. In order to insure flashing of only one flashlamp (the nearest unflashed lamp to the pulse source) per firing pulse, it is desirable that the series resistors have relatively large values of resistance as compared to the resistances of the flashlamp filaments. On the other hand, low values of series resistances are desired, because large values of series resistance consume relatively large amounts of energy from the firing pulse so that it is necessary to provide a greater amount of firing pulse energy to insure that all of the lamps can be flashed. Such a greater amount of firing energy tends to cause quick filament burnout of the first lamp whereupon the excess firing pulse energy will undesirably flash the second lamp of the array. It has been found that this dilemma of desiring larger resistance values for one reason, and smaller resistance values for another reason, is not easy to resolve satisfactorily for insuring that only one flashlamp will flash per firing pulse and also that the energy per pulse will be capable of successively flashing all of the lamps of the array, with an economically feasible value of firing pulse voltage. These difficulties tend to offset an important advantage of the resistance network circuit; its low cost, so that the resistor circuit can be included in a throwaway multiple lamp unit, whereby only two electrical connections need be provided between the multiple lamp unit and the camera or flash adapter with which it is used.

The reliability of the above-described resistance sequential flashing circuit can be improved if the flashlamps of the array have differing filament resistances, the lamp nearest the firing pulse source having the lowest filament resistance and the remaining lamps having successively higher values of filament resistance. However, this expedient suffers the disadvantage of higher costs of manufacturing the different-resistance lamps and of keeping track of which lamps have which filament resistance during storage and during assembly into the flash array. Another disadvantage of an array in which the lamps have differing filament resistances, is a reduction of flashing reliability because some of the lamps will not have optimum filament resistance for being flashed from the firing pulse.

SUMMARY OF THE INVENTION

Objects of the invention are to provide an improved resistance type of circuit for sequentially flashing flashbulbs; to provide such a circuit which is free from the above-described disadvantages of prior resistance circuits; and to provide such a circuit that is low in cost and highly reliable in operation.

The invention comprises, briefly and in a preferred embodiment, a basic circuit configuration of four photoflashlamps connected in series in a closed electrical loop. Two resistors are connected "crisscross" between diagonally opposite lamp junctions of the series loop. The circuit is adapted for connection to a source of firing pulses across one of the flashlamps. The two resistors have values of resistance for causing the lamps to be flashed sequentially, one at a time, by sequentially occurring firing voltage pulses. The invention further comprises a combination of two or more of the basic circuit configurations connected together so that the "last" lamp of one configuration functions simultaneously as the "first" lamp of the next configuration. By thus combining basic configurations, and by omitting one or more of the lamps or replacing them with resistors, a circuit array of any desired number of flashlamps may be provided. The simplified circuit of the invention requires only two resistors for controlling four flashlamps, or four resistors for controlling seven flashlamps, whereas prior resistance circuits have required about the same number of resistors as lamps. Thus, the invention reduces the number of resistors by about one-half. The circuit of the invention also achieves a desirable function of equalizing the amount of firing pulse energy that is successively applied to the different flashlamps, thus improving the reliability of flashing one lamp per firing pulse.

DESCRIPTION OF THE PREFERRED EMBODIMENT

Figure 1:
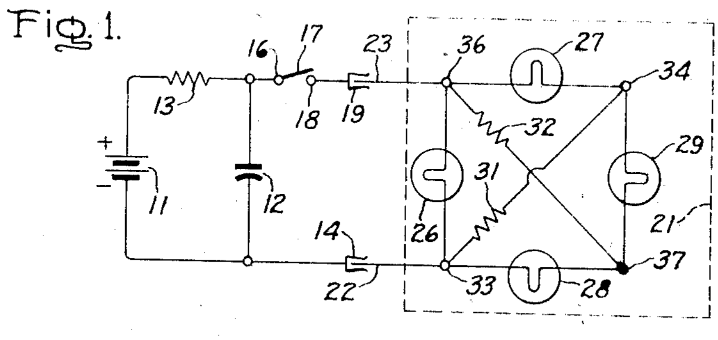
FIG. 1 is an electrical schematic diagram of a preferred embodiment of the invention.

In the circuit of FIG. 1, a battery 11 is connected to charge a capacitor 12 through a resistor 13. In a preferred arrangement, the battery 11 has a voltage of 6 volts, the capacitor 12 has a capacitance of 500 microfarads, and the resistor 13 has a resistance of 1,000 ohms. One terminal of the capacitor 12 is connected to a connector plug terminal 14, and the other terminal of capacitor 12 is connected to a terminal 16 of a switch 17, the other terminal 18 thereof being connected to a second connector plug terminal 19. The switch 17 is adapted to be momentarily closed in synchronization with the opening of a camera shutter, in well-known manner. The circuitry thus far described functions as a source of electrical energy pulses for flashing photoflashlamps, and may be incorporated in a camera, or in a flash attachment for use with a camera. Although the firing pulse is sometimes called a "voltage" pulse, it is primarily the energy of the pulse, comprising the combination of voltage, current, and time duration, that causes a lamp to flash.

A flashlamp array unit 21 is provided with a pair of connector prongs 22 and 23 adapted for electrical engagement with the terminals 14 and 19, respectively. The unit 21 contains four photoflashlamps 26 through 29 which may be of conventional type, such as General Electric type AG-1, each containing a filament provided with electrical connection lead wires and adapted for initiating a flash of combustible material contained within the bulb. The filaments of the flashlamps 26–29 are connected in series in a closed electrical loop, and a pair of resistors 31, 32 are connected "crisscross" between diagonally opposite lamp junctions; that is, the resistor 31 is connected between the diagonally opposite lamp junctions 33 and 34, and the resistor 32 is connected between the diagonally opposite lamp junctions 36 and 37. The resistors 31 and 32 have different values of resistance; for example, if the flashlamps 26–29 each have a filament resistance of 0.6 ohm, the resistor 31 can have a resistance of about 0.33 ohm and the resistor 32 can have a resistance of about 0.62 ohm. Thus, the resistance of resistor 32 is approximately the same as the lamp filament resistance, and that of resistor 31 is about half this value. The connector prongs 22 and 23 are connected electrically to the junctions 33 and 36, across the first lamp 26.

Preferably the lamps 26–29 of the array 21 are provided with individual reflectors, and arranged to radiate the light emitted therefrom in the same direction. If desired, another combination of lamps and resistors may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from a single unit. Other connector prongs similar to 22 and 23 could be provided for connecting the rear array of lamp circuitry to the connectors 14 and 19 when the unit is turned around so that the "rear" array of flashlamps faces frontwardly.

If desired, the flash array unit 21 may be removed from the camera or flash adapter after some of its lamps have been flashed, and reinserted at a later time for flashing the remaining lamps. After the lamps have been flashed, the array unit 21 may be discarded.

The circuit of FIG. 1 functions as follows. Upon a momentary closing of the switch 17, in synchronization with the opening of a camera shutter, the electrical energy stored in the capacitor 12 discharges into the circuit of the lamp unit 21, in the form of an electrical pulse having an approximately exponential decay characteristic. Most of the capacitor's electrical energy discharges through the filament of the first lamp 26, and the remaining pulse energy flows through three parallel paths provided by the lamps 27, 28, and 29; the resistor 31 and lamp 27; and the resistor 32 and lamp 28. The pulse energy flowing through the first lamp 26 is sufficient for causing this lamp to flash, whereas the amount of pulse energy flowing through the filaments of the remaining lamps is not sufficient for causing them to flash. As the electrical energy of the pulse from capacitor 12 discharges through the filament of lamp 26, the filament resistance (which initially is about 0.6 ohm) increases as the filament becomes incandescent, and the filament burns out and becomes an open circuit as the lamp flashes. The moment at which the lamp 26 flashes and its filament becomes an open circuit, is a critical moment at which the next lamp is most likely to undesirably flash, because when the filament of lamp 26 becomes an open circuit the remaining energy in capacitor 12 is available for the remaining lamps. However, at this moment the energy remaining in capacitor 12 has been reduced, due to portions of the firing pulse energy having been drained off through the three parallel paths described above, to a value such that it cannot cause another lamp to flash.

Upon the next momentary closing of the switch 17, in synchronization with the opening of the camera shutter, most of the electrical discharge pulse energy from the capacitor 12 flows through the second flashlamp 27, via the resistor 31, since the first lamp 26 now is an open circuit and resistor 32 has a higher resistance than does resistor 31. The energy discharge through lamp 27 is reduced slightly by the energy flowing through resistor 32 and lamp 28, but is ample for causing the lamp 27 to flash. Upon the next (third) momentary closing of switch 17, the previously flashed lamps 26 and 27 are open circuits, and most of the pulse energy from capacitor 12 flows through the resistors 32 and lamp 28, causing lamp 28 to flash. When the next (fourth) firing energy pulse occurs, it flows through resistors 31, 32, and lamp 29 in series, causing the lamp 29 to flash.

The circuit of FIG. 1 not only is simple and economical to manufacture, since it employs only two resistors for controlling the sequential flashing of four lamps, but it also achieves equalization of the firing pulse energy applied to each lamp to be flashed, thus improving the reliability of flashing one (and only one) lamp per firing pulse. This equalization is achieved by consuming approximately equal portions of energy of each of the firing pulses in the resistor circuit as the various lamps are flashed, this partial consumption of firing pulse energy being due to drainoff in parallel circuits when the "earlier" lamps are flashed, and also being due to energy loss in series resistance when "later" lamps are flashed. For example, when the first lamp 26 is being flashed, a portion of the firing pulse energy is drained off through the three parallel circuit branches composed of lamps 27, 28, 29; resistor 31 and lamp 27; and resistor 32 and lamp 28. When the second lamp 27 is being flashed, there is a lesser drainoff of pulse energy, through resistor 32 and lamp 28, and there also is some loss of pulse energy in the series resistor 31. When the third lamp 28 is being flashed, there is a small drainoff of pulse energy through the series path of resistor 31, lamp 29, and resistor 32, and a relatively greater loss in the series resistor 32. When the fourth lamp 29 is being flashed, there is pulse energy loss in the series resistors 31 and 32.

Figure 5:
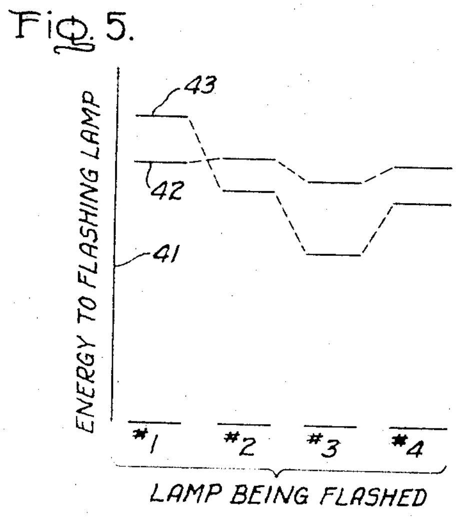
FIG. 5 is a set of plots of the firing pulse energy sequentially applied to each flashlamp, for the circuit of FIG. 1 and also for a prior art resistor circuit.

FIG. 5 illustrates how the aforesaid pulse energy losses, in series and parallel resistance circuits, equalize the firing pulse energy applied to each lamp to be flashed. In FIG. 5, the vertical axis 41 represents firing pulse energy applied to the lamp to be flashed, versus a horizontally arranged representation of the four lamps of an array. The plot 42 indicates, in the solid line portions thereof, the pulse energy applied sequentially to each of the lamps to be flashed. For comparison, the plot 43 indicates, in the solid line portions thereof, the firing pulse energy applied sequentially to each of the lamps to be flashed in a prior art resistance circuit in which resistors having resistance values of about 5 or 10 ohms are successively connected in series with the lamps. The plots 42 and 43 indicate the improved uniformity of firing pulse energy achieved by the simplified circuit of the invention.

Figure 2:
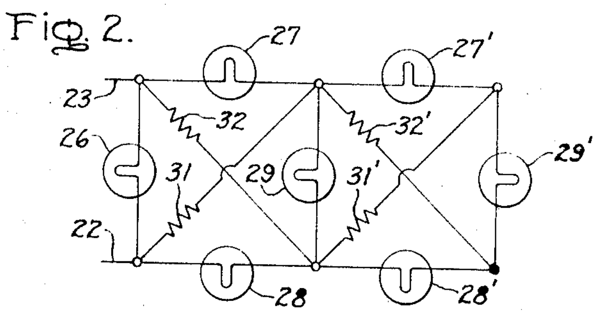
FIGS. 2, 3 and 4 show modifications of the circuit of FIG. 1 in accordance with the invention.

The seven-lamp circuit of FIG. 2 includes the four-lamp basic configuration of FIG. 1, with an additional circuit configuration connected across the fourth lamp 29. The lamp 29 functions both as the fourth lamp of the first configuration and as the first lamp of the second configuration. After the lamp 29 is flashed, the lamps 27′, 28′, and 29′ flash sequentially in the same manner as described above for the lamps 27, 28, and 29.

Figure 3:
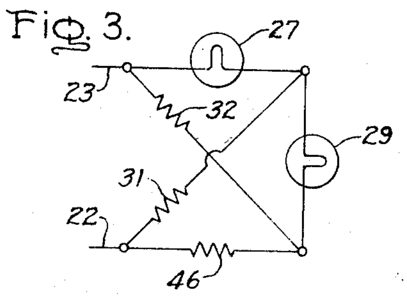

Any one or more of the flashlamps can be replaced with a resistor, if fewer lamps are desired in an array. FIG. 3 shows a circuit in which the lamp 28 has been replaced with a resistor 46. Also, the first lamp 26 can be omitted as shown in FIG. 3. If the first lamp 26 is omitted, the second lamp 27 can also be omitted. Alternatively, the last lamp 29 can be omitted. By combining the principles of multiple circuit configurations as shown in FIG. 2 and lamp omission or resistor substitution for lamps as shown in FIG. 3, the circuit of the invention can be made to sequentially flash various numbers of lamps.

Figure 4:
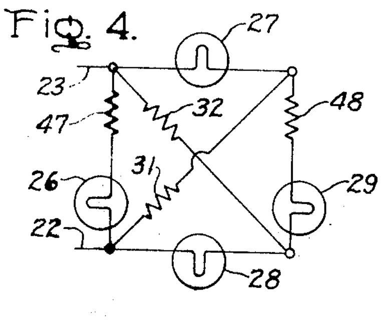

The circuit of FIG. 4 is the same as FIG. 1 except that resistors 47 and 48 are added in series with the flashlamps 26 and 29, respectively. This improves the reliability of flashing a single lamp per firing pulse, but increases the cost and complexity of the circuit. Suitable values for these resistors are 0.15 ohm for the resistor 47 and 0.4 ohm for the resistor 48. Resistors also can be added in series with the lamps 27 and 28 for further improvement in reliability. Alternatively, the flashlamps may be provided with differing values of filament resistance.

The circuitry of the invention can be incorporated into a camera or flash adapter instead of in a disposable flash array, with the requisite number of electrical connectors being provided for connecting the filament lead wires of the lamps 26, etc., of the array respectively to the different points of 33, 34, etc., of the circuit.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflashlamps to be flashed sequentially by sequential firing energy pulses, wherein the improvement comprises at least four terminal points, the first and second ones of said terminal points constituting a first pair of terminal points, the second and third ones of said terminal points constituting a second pair of terminal points, the third and fourth ones of said terminal points constituting a third pair of terminal points, and the fourth and first ones of said terminal points constituting a fourth pair of terminal points, means adapted to electrically connect a plurality of photoflashlamps respectively across at least some of said pairs of terminal points, a first circuit resistor connected between said first and third terminal points, and a second circuit resistor connected between said second and fourth terminal points, said first and fourth terminal points being adapted for connection to a source of said firing energy pulses.

2. A circuit as claimed in claim 1, in which said means is adapted to electrically connect said photoflashlamps across less than all of said pairs of terminal points, and including one or more resistors connected across at least one of the remaining pairs of terminal points.

3. A circuit as claimed in claim 1, including resistance means interposed in series with one or more of said photoflashlamps.

4. A circuit as claimed in claim 1, in which the resistance of one of said circuit resistors in approximately twice that of the other.

5. A circuit as claimed in claim 1, including fifth and sixth terminal points, said second and fifth terminal points constituting a fifth pair of terminal points, said fifth and sixth terminal points constituting a sixth pair of terminal points, and said sixth and third terminal points constituting a seventh pair of terminal points, means adapted to electrically connect a plurality of photoflashlamps respectively across at least some of said fifth, sixth and seventh pair of terminal points, a third circuit resistor connected between said second and sixth terminal points, and a fourth circuit resistor connected between said third and fifth terminal points.

6. A circuit as claimed in claim 5, in which said first and second circuit resistors have relatively different values of resistance, and in which said third and fourth circuit resistors have relatively different values of resistance.

7. A circuit as claimed in claim 6, in which the resistance of said second circuit resistor is approximately twice that of said first circuit resistor, and in which the resistance of said fourth circuit resistor is approximately twice that of said third circuit resistor.

8. A circuit for causing a plurality of photoflashlamps to be flashed sequentially by sequential firing energy pulses, wherein the improvement comprises four photoflashlamps connected in series in a closed electrical loop, first and second resistors respectively connected between diagonally opposite lamp junctions of said series loop, and means adapted to connect a first one of said lamps to a source of said firing pulses.

9. A circuit as claimed in claim 8, including resistance means interposed in series with one or more of said photoflashlamps.

10. A circuit as claimed in claim 8, in which the resistance of one of said resistors is approximately twice that of the other.

11. A circuit as claimed in claim 8, including first and second terminal points, the lamp electrically opposite said first lamp being electrically connected across said first and second terminal points, and further including third and fourth terminal points, a third resistor connected between said first and fourth terminal points, a fourth resistor connected between said second and third terminal points, said first and third terminal points constituting a pair of terminal points, said third and fourth terminal points constituting a pair of terminal points, and said fourth and second terminal points constituting a pair of terminal points, and a plurality of photoflashlamps respectively connected electrically across at least some of said pairs of terminal points.

12. A circuit as claimed in claim 11, in which said photoflashlamps are connected across less than all of said pairs of terminal points, and including one or more resistors connected across at least one of the remaining pairs of terminal points.

13. A circuit as claimed in claim 11, in which said first and second resistors have relatively different values of resistance, and in which said third and fourth resistors have relatively different values of resistance.

14. A circuit as claimed in claim 13, in which the resistance of said second resistor is approximately twice that of said first resistor, and in which the resistance of said fourth resistor is approximately twice that of said third resistor.

* * * * *